United States Patent

Smoot

Patent Number: 5,883,606
Date of Patent: Mar. 16, 1999

[54] FLAT VIRTUAL DISPLAYS FOR VIRTUAL REALITY

[75] Inventor: Lanny Starkes Smoot, Morris Township, N.J.

[73] Assignee: Bell Communications Research, Inc., Morristown, N.J.

[21] Appl. No.: 767,751

[22] Filed: Dec. 17, 1996

Related U.S. Application Data

[60] Provisional application No. 60/008,821, Dec. 18, 1995.

[51] Int. Cl.<sup>6</sup> ...................................................... G09G 5/00
[52] U.S. Cl. .................................. 345/7; 345/8; 348/115; 348/751; 348/756; 359/630
[58] Field of Search ....................... 345/7, 8, 9; 348/761, 348/751, 756, 766, 115; 359/619, 630, 40–42, 49

[56] References Cited

U.S. PATENT DOCUMENTS

| | | | |
|---|---|---|---|
| 4,948,214 | 8/1990 | Hamblen | 350/413 |
| 5,268,977 | 12/1993 | Miller | 385/33 |
| 5,369,415 | 11/1994 | Richard et al. | 345/6 |
| 5,398,125 | 3/1995 | Willett et al. | 359/41 |
| 5,467,206 | 11/1995 | Loiseaux et al. | 359/40 |
| 5,499,138 | 3/1996 | Iba | 359/569 |
| 5,579,161 | 11/1996 | Sekiguchi | 359/559 |
| 5,594,493 | 1/1997 | Nemirofsky | 348/13 |
| 5,625,372 | 4/1997 | Hildebrand et al. | 345/8 |
| 5,644,323 | 7/1997 | Hildebrand et al. | 345/8 |
| 5,673,127 | 9/1997 | Takahara et al. | 359/40 |
| 5,684,548 | 11/1997 | Ariki et al. | 349/57 |

*Primary Examiner*—Jeffery A. Hofsass
*Assistant Examiner*—Ashok Mannava
*Attorney, Agent, or Firm*—Joseph Giordano; David A. Hey; Loria B. Yeadon

[57] ABSTRACT

Disclosed is a virtual display (300) which provides a wide field-of-view that is lightweight and may be as thin as ordinary eyeglasses. One version of the invention includes a display (302), such as an LCD, a microlens array (304), and an aperture array (306) disposed between the LCD and the microlens array. The virtual display provides a pin-point of light for each pixel (306) of a display (302). Each pin-point of light in collaboration with an associated microlens (308) generates a directed ray of light. The ensemble of these rays forms a coherent image on a viewer's retina. Using high "f" number microlenses permits a very short focal length between the pin-points and the microlenses and thus provides a very thin virtual display. The aperture array may be provided by a plate disposed between the display and the lens, or it may be apertures configured on the back side (away from the viewer) of the microlenses or on the front (towards the viewer) of the display. Each aperture in the array receives light from one pixel and directs a pin-point of that light to a microlens in the microlens array. Each microlens receives a single pin-point and directs the resulting ray so that a coherent image is formed on the viewer's retina.

7 Claims, 7 Drawing Sheets

FLAT VIRTUAL DISPLAYS FOR VIRTUAL REALITY

RELATED APPLICATIONS

This application claims the benefit of U.S. Provisional Application Ser. No. 60/008,821, filed on Dec. 18, 1995 and entitled "Flat Virtual Displays for Telepresence and Virtual Reality". The provisional application names the same inventor as named and discloses subject matter claimed herein. The content of this provisional application is incorporated herein by reference.

The following U.S. patents and patent application include subject matter related to the present invention:

(1) U.S. Pat. No. 5,187,571, entitled "Television System for Displaying Multiple Views of a Remote Location", which issued on Feb. 16, 1993 to D. A. Braun, W. A. E. Nilson, III, T. J. Nelson, and L. S. Smoot and assigned to the assignee herein;

(2) U.S. Pat. No. 5,537,737, entitled "Camera Arrangement With Wide Field-of-view", which issued on Jul. 12, 1996 to D. A. Braun and assigned to the assignee herein; and (3) Provisional Patent Application Ser. No. 60/008,822, filed on Dec. 18, 1995 and related U.S. patent application Ser. No. 08/767,752, entitled "Head Mounted Displays Linked to Networked Electronic Panning Cameras", filed concurrently herewith, invented by D. A. Braun and L. S. Smoot, and assigned to the assignee herein.

The contents of the foregoing documents are incorporated herein by reference.

BACKGROUND OF THE INVENTION

1. Field of the Invention

The present invention relates to flat virtual displays and, more particularly, to a virtual display comprising a thin display, such as a liquid crystal display (LCD), a microlens array, and an aperture array. The aperture array is configured to direct pin-points of light from the display onto a microlens in the microlens array. Each microlens directs a single ray of light so that the rays form a coherent image on a viewer's retina. This arrangement provides a very small, lightweight virtual display. The inventive display may be used for a head-mounted display, a display which may be embedded into a smart card, or other uses where a small, lightweight display may be advantageous.

2. Discussion of Related Art

Researchers in communications technologies continue to seek ways to provide a person with a greater sense of "being there" via networked communications. Two well known examples of providing this sense are (1) teleconferencing—which provides face-to-face communications to persons at remote locations—and (2) virtual reality—which provides a person with the feeling of actually being at a particular (real or imaginary) location.

The assignee of the present invention, Bell Communications Research Corp. (Bellcore) has developed several such new technologies. One technology developed by Bellcore is an Electronic Panning Camera (described in U.S. Pat. Nos. 5,187,571 and 5,537,737) which provides users with individually controllable views of remote locations, each view being delivered from a single non-moving camera. The Electronic Panning Camera is an inventive device and method for producing a widely pannable video signal from a composite camera with no moving parts. A composite camera is composed of several miniature standard video cameras whose fields-of-view are optically and seamlessly merged to form a broad panoramic field-of-view.

The inventor believes, however, the ultimate in visual immersion is achieved by combining the Electronic Panning Camera's ability to allow several persons to individually control their views of remote sites with techniques borrowed from the emerging field of Virtual Reality. One problem, however, with this combination, and with conventional networked virtual reality systems, is the head-mounted displays typically worn to access this experience are heavy (often weighing several pounds, with much of this weight centered forward of the user's face), uncomfortable, and often quite expensive.

Almost all attempts at virtual reality displays have used a planar display of some kind (usually a flat-panel liquid crystal display) and a lens system. FIG. 1 illustrates such a system 100. A housing 102 contains at one end a liquid crystal display (LCD) 104 and at the other end is an aperture 106 through which a user's eye 108 may look at the LCD 104. Interposed between the aperture 106 and the LCD 104 is bulk optics 110 for focusing the LCD 104 display onto the eye. Note that in order for the image on the LCD display to properly focus on the user's eye 108, there is a first length 112, which is substantially a first focal length between the LCD 104 and the optics 110, and a second length 114, which is substantially a second focal length between the optics 110 and the aperture 106. There are many variations on this structure, but each attempts to portray a highly magnified image for each of the user's eyes that appears to be placed at, or near, virtual infinity so that the eye can easily focus on it.

The resulting head-mounted displays are physically large due to (1) thick, low f-number, display-sized lenses and (2) the long optical path lengths required for these lenses. The displays are also heavy, due to the weight of the glass or plastic comprising the optics, and uncomfortable to wear because this large and heavy display/lens-system is cantilevered out over the front of the head and tends to tilt the wearer's head forward.

In more advanced head-mounted displays (e.g., those used in military aircraft), the image is often relayed by a series of mirrors and/or intermediate lenses, or even coherent bundles of optical fiber, from a display that is remote from the eye. In these cases, one or more bulk lenses (or mirrors) are again used at the end of the optical relay system closest to the user's eye to create an image that appears to be at virtual infinity. Some displays use a semi-transparent visor as part of the virtual imaging system and causes the ultimate virtual image to be displayed by way of partial refection. Again, focal lengths on the order of several inches and large reflecting surfaces make these systems cumbersome and bulky.

Refection Technology Inc. located in Waltham, Mass. provides a head-mounted display under the trade name "Private Eye". This HMD display uses a linear array of LEDs to create the image. The image of the LEDs is swept through a fixed angle by a vibrating mirror. The swept image is viewed through one or more bulk optics lenses. (This technology is used, for example, in Sega's "Virtual Boy"). Although the technique does not use a planar screen, it uses bulk optics and results in a display that protrudes from the face much more than an ordinary pair of spectacles.

A head-mounted display developed at the University of Washington at Seattle, uses a laser beam to scan directly into the eye and "paints" an image on the retina. This technique could lead to a less bulky display, but requires a rather sophisticated scanning system and multi-colored lasers for a color image. This device is difficult and expensive to implement.

Therefore, it is an object of the present invention to provide a head-mounted display for virtual reality that is light and comfortable.

It is another object of the present invention to provide a virtual display that is inexpensive to manufacture.

SUMMARY OF THE INVENTION

These and other objects of the present invention are provided by a virtual display which provides a wide field-of-view that is lightweight and may be as thin as ordinary eyeglasses. Such a display may be used as a head-mounted display or for a display where a small, thin, lightweight display may be advantageous, such as a display embedded in a smart card or for a laptop or palmtop computer.

The inventive virtual display provides a pin-point of light for each pixel of the display. Each pin-point of light in collaboration with an associated microlens generates a directed ray of light. The ensemble of these rays forms a coherent image on a viewer's retina. Using low "f" number microlenses permits a very short focal length between the pin-points and the microlenses and thus provides a very thin virtual display.

A preferred embodiment of the present invention includes a display, such as an LCD, a microlens array, and an aperture array disposed between the LCD and the microlens array. The aperture array may be provided by a plate disposed between the display and the lens, or it may be apertures configured on the back side (away from the viewer) of the microlenses or on the front (towards the viewer) of the display. Preferably, each aperture in the array receives light from one pixel and directs a pin-point of that light to a microlens in the microlens array. Each microlens receives a single pin-point and directs the resulting ray so that a coherent image is formed on the viewer's retina. Another embodiment uses a first microlens array to focus a pin-point light source onto pixels of a display and a second microlens array to receive pin-points of light from the display and to direct the resultant light rays to the desired image point on the retina. The microlenses used in a preferred embodiment of the inventive display have a diameter on the order of the diameter of a pixel in a typical LCD display (e.g., 100 microns) and, for f1 lenses, this diameter will also be the microlenses' focal length. Thus, a display system made in this manner is preferably only several hundred microns thicker than the LCD display itself. Since current LCD manufacturing techniques can produce displays on the order of a few millimeters thick, the entire display can approach the thickness of an ordinary pair of eyeglasses. In another preferred embodiment, the microlens array may comprise spherical lenses each having a fractional "f" value.

The inventive display may be used in any application where a small, lightweight display is advantageous. Examples of applications include head-mounted displays, smart cards, and laptop and palmtop computer displays.

BRIEF DESCRIPTION OF THE DRAWINGS

The present invention is described with reference to the following figures.

DETAILED DESCRIPTION OF PREFERRED EMBODIMENTS

The application is described in the following sections:
I. Overview of the Invention: An overview of the invention is provided with reference to FIGS. 2 and 3.
II. Structure and Operation of a Preferred Embodiment: The structure and operation of the present invention is provided with reference to FIGS. 3–6.
III. Alternative Uses for the Present Invention: Alternative uses for the flat screen according to the present invention is provided with reference to FIGS. 7A, 7B, 7C, and 8.
V. Conclusion: A conclusion is provided.

Overview of the Invention

Figure 1:
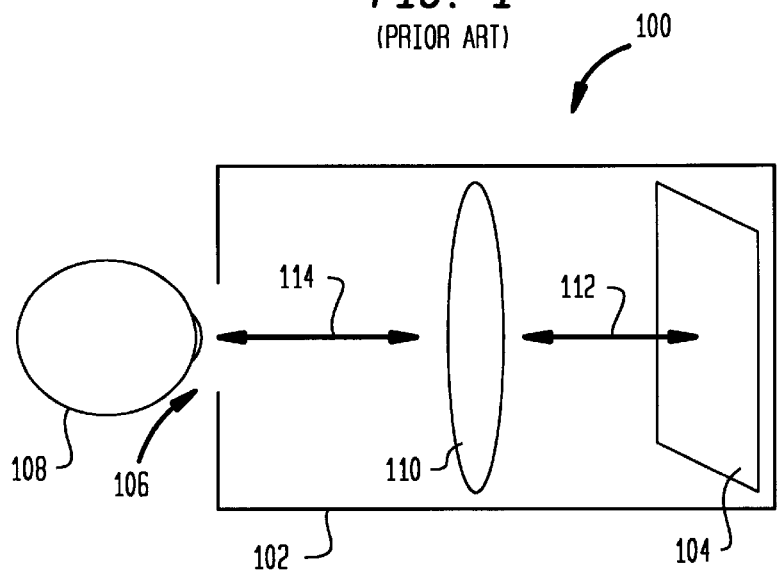
FIG. 1 illustrates a conventional virtual reality display.
Figure 2:
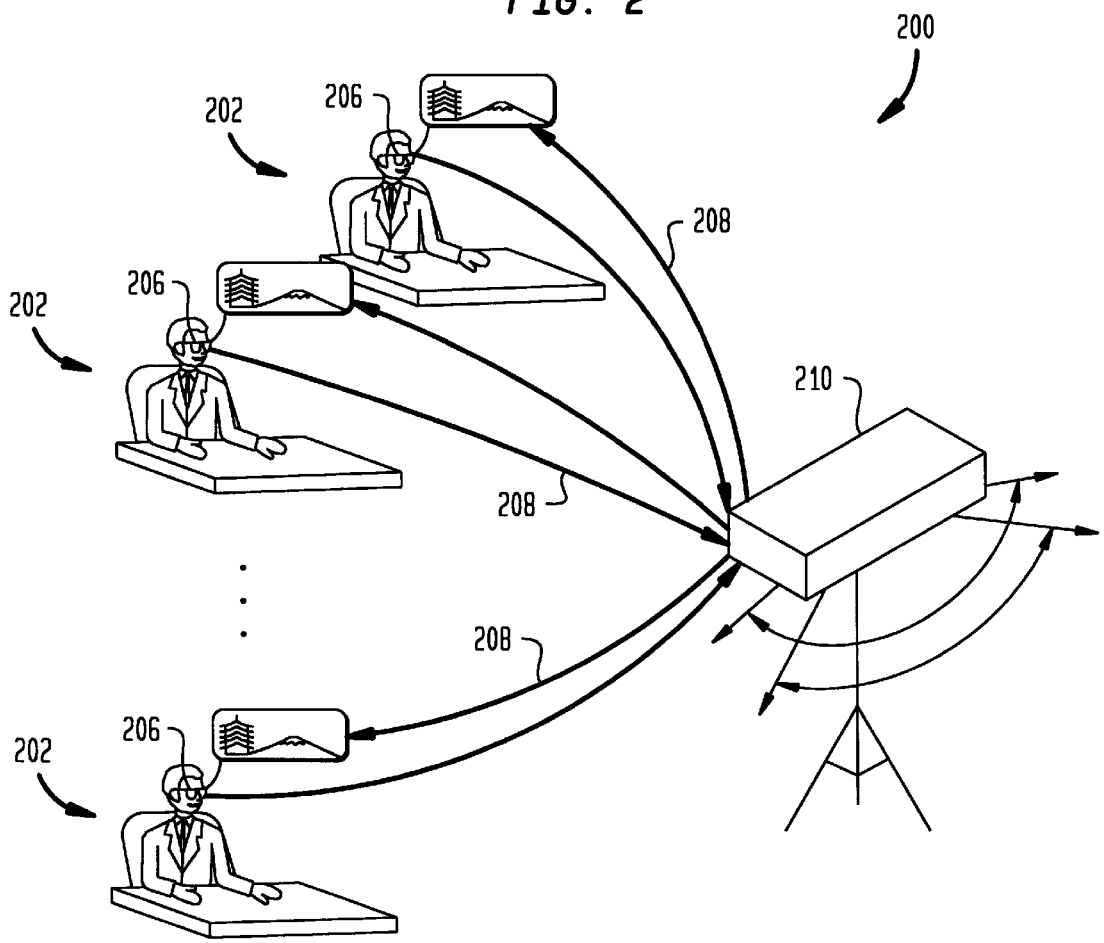
FIG. 2 illustrates a multiple user communications network wherein users wearing head-mounted displays according to the present invention employ an electronic panning camera which allows a number of persons individually to control their views of remote sites.

FIG. 2 illustrates a communications network 200 in which the present invention may be used. The network is provided to a number of subscribers 202. Each subscriber 202 wears a head-mounted display 206 with conventional gaze-direction sensors. The head-mounted displays 206 are connected via wires 208 (or a wireless connection) to a remotely located image input, such as an Electronic Panning Camera 210. The Electronic Panning Camera 210 extracts the proper view of the remote site for each subscriber 202 corresponding to his or her instantaneous gaze direction. This communications network 200 may be advantageously implemented using the head-mounted display 206 according to the present invention.

Figure 3:
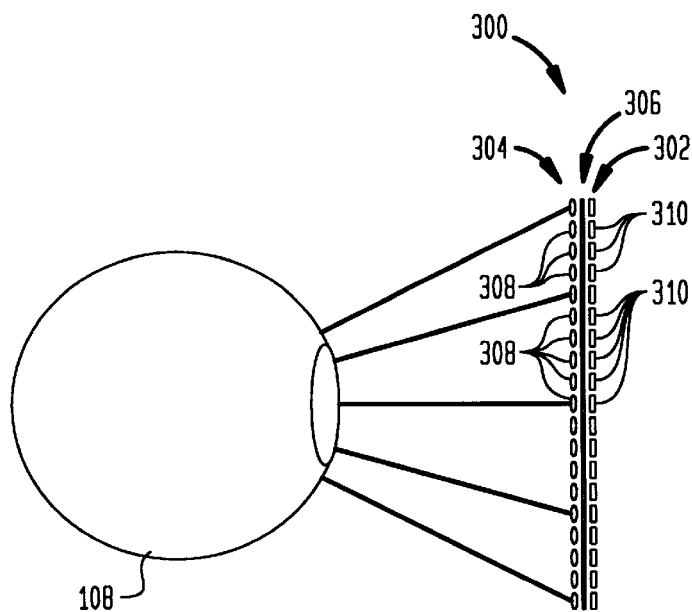
FIG. 3 illustrates a flat display according to a preferred embodiment of the present invention.

As seen in FIG. 3, the present invention provides a virtual display 300 using a small display 302 (such as an LCD), a microlens array 304, and an aperture array 306 disposed between the display and microlens array. Such a display 300 may be used in the head-mounted display 206 of FIG. 2.

Structure and Operation of a Preferred Embodiment

A preferred embodiment of the present invention provides a display having a number of pixels and means for providing rays of light from each pixel that are coherently directed to form a coherent image on a viewer's retina.

FIG. 3 is a schematic illustration of a first preferred embodiment of a virtual display 300 according to the present invention. The display 302 may be a standard LCD of the type currently used in today's virtual reality displays or small portable LCD TV displays, such as in the "Casio Pocket Television TV 30". A microlens array 304 is employed in a manner such that each microlens 308 images a single pixel 310 in the display. Each microlens 304 is preferably mounted in front of a single aperture which in turn is mounted in front of the pixel it is to image. The aperture is a means for ensuring that a pin-point of light from a pixel 310 is directed only to a corresponding microlens 308. The aperture is also a means for ensuring that the light from a pixel is directed to the microlens at an angle so that the microlens directs a single ray of light from that pixel to the proper coherent point in a remote image plane, along with the rays from each of the other pixels. In a preferred embodiment, an aperture array 306 is disposed between the microlens array 304 and the display 302. The aperture array may be a plate having apertures, or may be an array that is configured on a front (facing the viewer) side of the display 302 or on a back (away from the viewer) side of the lens array 304.

A microlens array 304 according to a preferred embodiment of the present invention is an array of very small lenses (for example, a lens as small as 50 microns in diameter may easily be fabricated in plastic lens sheets). The array may have a periodic spatial structure with lenses on a rectangular, hexagonal, or other regular grid. The individual lenses can be round, square, or hexagonal; they may be closely-packed or spaced by (usually transparent and non-optically powered) substrate material. The lenses may also be fresnel lenses.

The microlenses 308 for a preferred embodiment of the present invention have diameters on the order of the diameter of a pixel 310 in LCD display 302 (e.g., 100 microns). Using f1 microlenses, this diameter may also be the microlenses' focal length. Thus, a virtual display according to the present invention will be only about 100 microns thicker than the LCD display itself. Current LCD manufacturing techniques produce displays on the order of a few millimeters thick. This means that the entire virtual display 300 can approach the thickness of an ordinary pair of eyeglasses.

The inventive device duplicates the focusing power of a single large lens (for a single sampled direction of view) by combining individual ray bundles of the separate microlenses 308. In an actual large lens all light that would lead to the creation of an in-focus virtual image behind the lens passes through the axis of the lens at the focal point. Preferably, microlenses 308 take a point-sample of each LCD pixel (located within a cylinder defined by the lens diameter) and create a ray bundle headed toward an on-axis aggregate focal point. An aggregate focal point is that point along the axis of the array wherein light rays from the microlens will converge.

In the present invention, to accurately direct a ray of light from each pixel 310 of the display 302 so that it will indeed pass through the axis at the combined lens-array aggregate focal point, each pixel is masked with a pin-hole in the aperture plate 306. As described in more detail below, each aperture is configured to direct light onto a microlens in a manner so that each microlens directs its light ray onto a desired aggregate focal point.

Figure 4B:
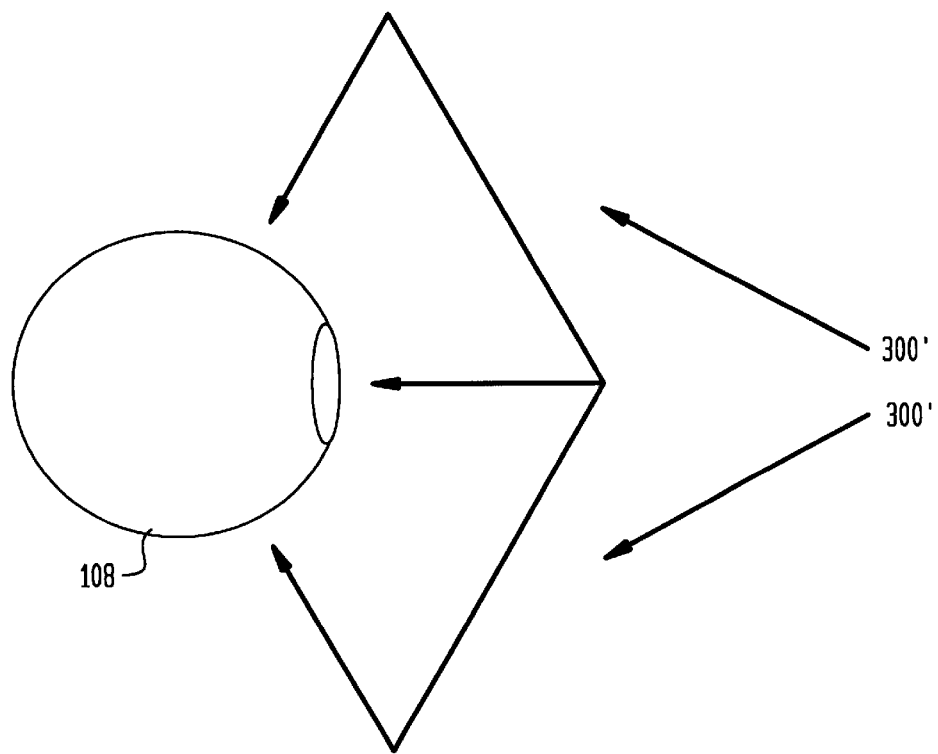
FIG. 4B illustrates another preferred embodiment of the present invention which increases the field-of-view.
Figure 4A:
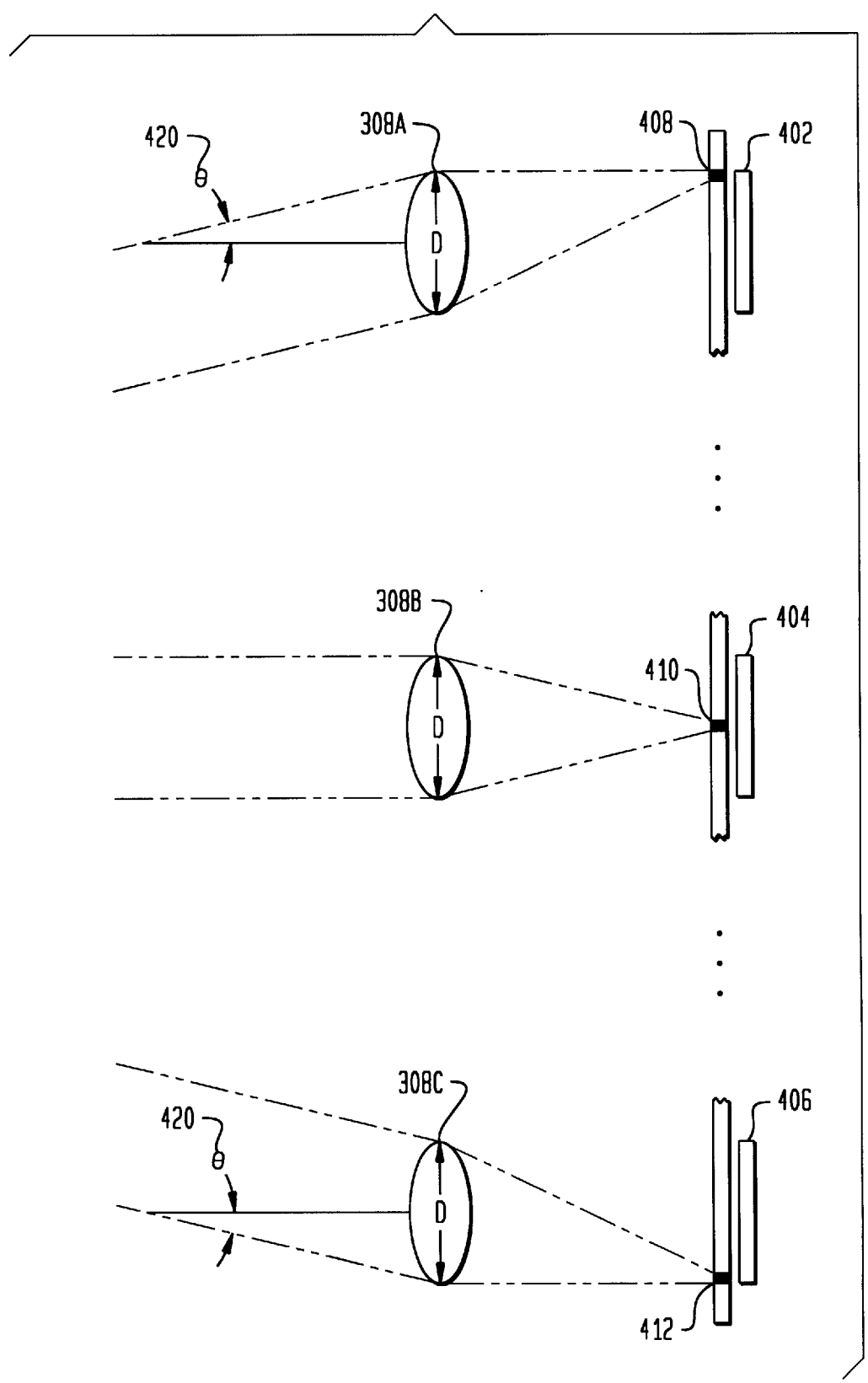
FIG. 4A illustrates the operation and field-of-view of the present invention.

FIG. 4A illustrates the operation of the present invention. FIG. 4A shows the structures associated with three pixels. These three pixels are a first pixel 402, located near the top of the display 302; a second pixel 404, located in the middle of the display; and a third pixel 406, located near the bottom of the display.

Note that the first pixel 402 is associated with a small aperture 408 located near the top of the pixel. This is because the aperture 408 is configured to direct a pin-point of light from the pixel to the associated microlens in a particular manner. The light from the aperture 408 is directed to a lens 308A. The angle of incidence of the light entering the lens 308A causes the lens to generate a ray of light directed toward an aggregate focal point.

The second pixel 404 located near the center of the display 302 is associated with an aperture 410 located near the center of the pixel 404. The light from the aperture 410 is directed to a lens 308B. The angle of incidence of the light entering the lens 308B causes the lens to direct a ray of light towards substantially the same aggregate focal point as the light from the first pixel 402.

The third pixel 406 located near the bottom of the display 302 is associated with an aperture 412 located near the bottom of the pixel 406. The light from the aperture 412 is directed to a lens 308C. The angle of incidence of the light entering the lens 308C causes the lens to direct a ray of light towards substantially the same aggregate focal point as the light from the first and second pixels 402, 404.

Thus, the location of the aperture associated with a pixel is determined by the location of the pixel in relation to the desired focal point. Thus, pixels located above the aggregate focal point have apertures located towards the top of the pixel, pixels located to the left of the aggregate focal point have apertures located towards the left side of the pixel, etc. The aperture array is arranged so the light from each pixel is directed to each associated lens so that the light ray from that pixel/aperture/lens combination is focused on a desired aggregate focal point.

FIG. 4A also illustrates the field-of-view of the present invention. The ultimate field of image view (angular extent subtended by the image) is limited by the "f" number of the microlenses 308 at the extreme edges of the array 304. Thus, lower "f" number microlenses 308 used in the array 304 increase the display's field-of-view.

As illustrated in FIG. 4A, the maximum viewing half-angle $\theta$ 420 for light exiting the lens 308 is related to the arc tangent of the lens "f" number. That is: $\theta = \tan^{-1}((D/2) \text{ focal length})$. An f1 lens produces a 27° per half-image angle, or a 54° field-of-view. This performance is as good or better than most of today's commercially available head-mounted displays. However, unlike the commercially available head-mounted displays, the inventive display provides this field-of-view in a wafer thin, light, and inexpensive display. This is in drastic contrast to the bulky, heavy, uncomfortable and/or expensive displays described above.

As seen in FIG. 4B, if greater resolution or a wider field-of-view is desired, two or more displays 300' according to the present invention may be tiled or abutted together at an angle. This angle is determined by the field-of-view of the individual panels, as is understood by those skilled in the art. The additional displays may add more lines of resolution, thus adding additional pixels to the display, or add additional degrees to the field-of-view. For example, for the illustrative embodiment described above, each display provides a 54° swath of the overall field-of-view, for a 108° field-of-view. This "tiling" technique has been employed in conventionally lensed virtual-reality systems for field-of-view improvement. For the present invention, the flatness of the resulting display is slightly compromised, but the weight advantage remains extremely substantial over the prior art.

An improvement to the present invention involves constructing the microlens array 305 using spherical microlenses. Spherical lenses may have fractional "f" numbers. As noted above, the smaller the "f" number, the smaller the focal length and the greater the field-of-view. Thus, spherical lenses reduce the microlens focal length and thus increase the field-of-view of the display. With the proper combination of materials for the lenses and their substrate, the microlenses may be constructed to have a focal point just outside the sphere surface. Thus, extremely wide viewing angles such as 100° can be produced.

Figure 5A:
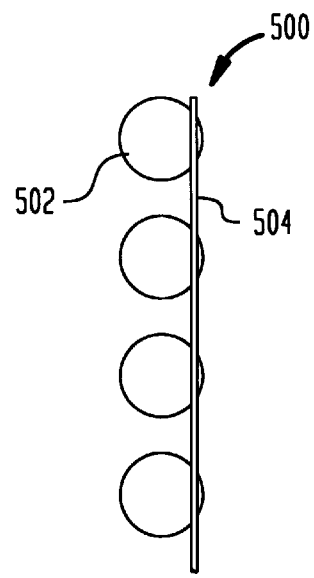
FIGS. 5A and 5B illustrate a preferred embodiment of the present invention using spherical lenses.

FIG. 5A is a side view of one such lens array 500. It is preferable to provide a high index of refraction difference between the lenses and their substrates by having the lenses interface with air. As seen in FIG. 5A, a lens array 500 preferably has glass or acrylic spherical lenses 502 held in place by an opaque or transparent and non-optically powered substrate material 504 which covers no more than substantially half of each sphere. Preferably, the substrate 504 contacts as little of the spheres 502 as possible.

Figure 5B:
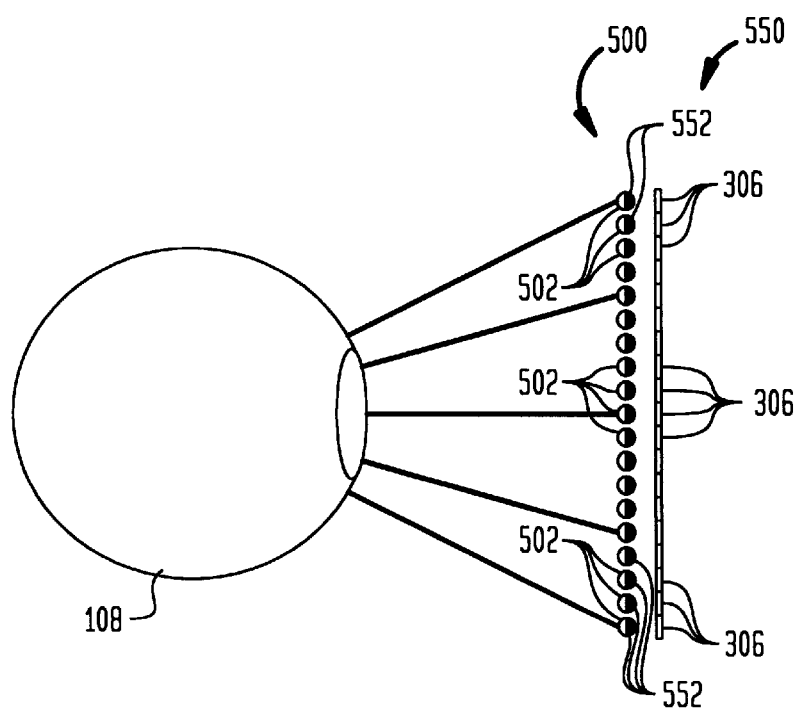

FIG. 5B illustrates an inventive display 550 using spherical lenses. As seen in FIG. 5B, an array 500 of spherical lenses 502 (for clarity, substrate 504 is not shown) may have apertures 552 printed on the "back" of each sphere (the side adjacent the display and away from the eye) in a self registering photolithographic process by coating the sphere backs with a negative opaque photoresist. The array may then be exposed through a front-mounted onaxis pinhole (at the desired aggregate focal point of the array). The resist may then be washed away to leave holes 552 in the back sides of the spheres 504 where light would enter after passing through the LCD display pixels 306. The apertures on the back of the spherical microlenses 504 replace the apertures of the aperture plate 308 of FIG. 3. (Alternatively, the apertures may be provided on the LCD display. This may be preferable because the array preferably is formed using a photolithographic process, and a typical LCD array is manufactured using such processes.) A flat virtual imaging display with 100° or more of horizontal and vertical field-of-view is thus easily achievable.

Figure 6:
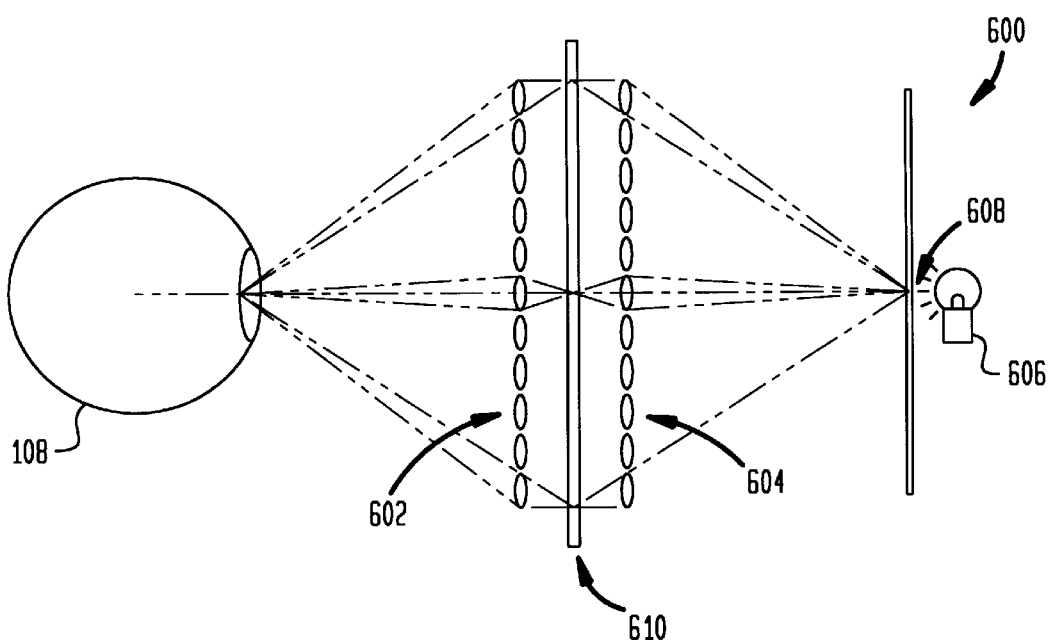
FIG. 6 illustrates another embodiment according to the present invention.

FIG. 6 illustrates another embodiment 600 of the present invention. Two lens arrays 602, 604 are used to provide an optically self-aligned device. First, a pin-point light source 606 is provided. A first lens array 604 is used to create the point sources of the "aperture array" for a second lens array 602. The intense, on-axis point light source 606 (an incandescent filament behind a single pinhole 608, for example) may be imaged by the first lens array 604 to create an image of this point-source at every aperture of the second lens array 602. An LCD display is placed at the common focal plane of the two arrays 602, 604. The composite system is effectively self-aligning. Note that the second lens array 604 focuses the light for (1) a top pixel towards the top of the pixel, (2) a center pixel towards the center of the pixel; and (3) a bottom pixel towards the bottom of the pixel. The images of the single, on-axis point light source are generated behind every microlens of the second lens-array 602 so that a light ray from each point on the display passes through the conjugate on-axis aggregate focal point on the observer's 108 side of the coupled lens arrays.

Alternative Uses for the Present Invention

There are several other applications for the inventive virtual display in addition to applications in the fields of virtual reality and head-mounted display/Electronic Panning Camera linkage as seen in FIG. 2 and described in more detail in the concurrently filed U.S. Patent Application ser. No. 68/767,752, and entitled "Head-Mounted Displays Linked to Networked Electronic Panning Cameras" described above. Two of these applications are smart card displays and laptop computer displays.

Smart cards are credit-card-sized devices which typically contain an on-board microprocessor, non-volatile and scratch-pad memory, and various methods for getting information into, and out of, the card. The cards are currently conceived as replacements for carry around cash, for secure identification, and other applications. Some smart cards are equipped with a minimal LCD display capable of displaying at most a few lines of text information.

It can be expected that in the near future, more technologically advanced smart cards will store many types of records, including dense text data, graphical images, animated sequences, and even limited video data. A current problem (and one that will be exacerbated in the future) is for the user to determine the content of the card, such as remaining cash balance, text, images, etc.

What is needed is a high-resolution, large-sized viewing screen capable of displaying the contents of the card, and an easy means of paging through the data on the card and possibly making simple modifications to this data. Such a large screen, however, is antithetical to the idea of a smart card, which should be very small and light.

Figure 7A:
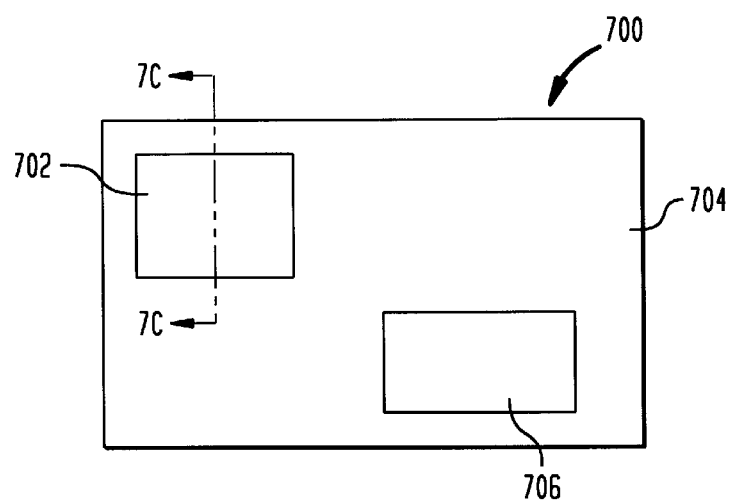
FIG. 7A is a front elevational view of a smart card having a flat virtual display according to a preferred embodiment of the present invention.

The flat microlens enabled display according to the present invention may be used here. As seen in FIG. 7A, a smart card 700 having a flat virtual display 702 according to the present invention may have the display embedded in a thin case 704 of the card and the entire arrangement is only slightly thicker than today's smart cards. As described below, an input device 706, such as a touch pad, may be provided on a surface of the card.

Figure 7B:
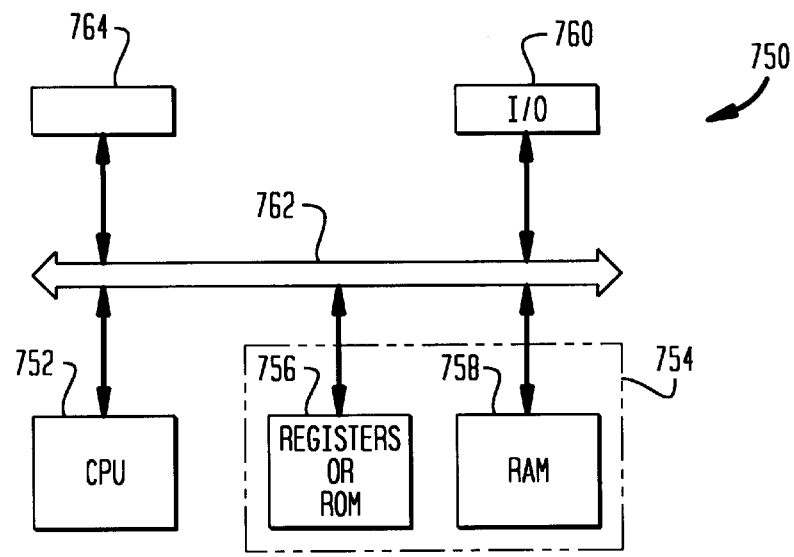
FIG. 7B is block diagram of a smart card according to a preferred embodiment of the present invention.

As seen in FIG. 7B, a smart card 700 comprises circuity 750 such as a processor 752 and memory 754. The processor 752 performs certain arithmetic operations and the memory (typically several registers or ROM 756 and a RAM 758) stores temporary values. An I/O 760 is provided to receive and transmit data. (This I/O may include input device 706.) These components 752–760 are connected by a bus 762. Also connected to the bus is an LCD display 764 for a virtual display according to the present invention.

Figure 7C:
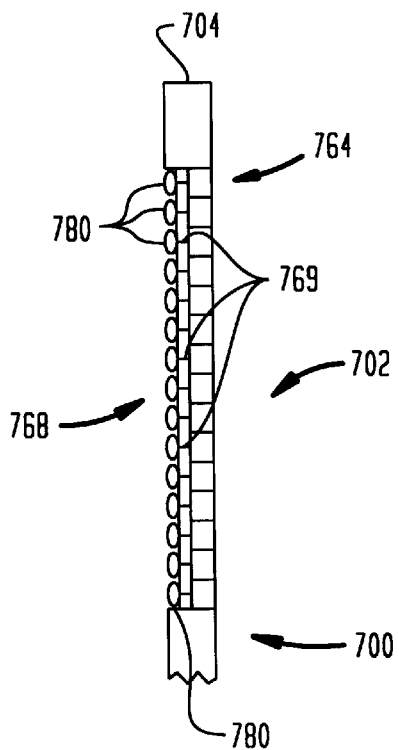
FIG. 7C is a cross-sectional view of the smart card of FIG. 7A taken along lines 7C—7C.

As seen in FIG. 7C (which is a cross-sectional view of the smart card of FIG. 7A taken along line 7C—7C), the card 700 has a virtual display 702 embedded in its thin case 704. The display 702 may use ambient back-light for the actual display 702. This display is preferably a very small, high resolution, liquid crystal display 764. A VGA-resolution display 764 that is approximately ½ inch diagonal is preferred. The aperture array 768 (used to make each of the pixels in the display act like a point-source) having apertures 769 may be laminated, photolithographically, or otherwise attached to the actual display and a short focal length lens-array 768 is transparently bonded to the top of the array. Alternatively, apertures may be printed onto the microlenses 780 as described with reference to FIG. 5 above. As seen in FIG. 7A, the entire display area forms a "viewing patch" which is ideally located near one of the corners of the card 700. Because the display is preferably liquid crystal and the back-light is ambient light, only a small battery may be provided to power the display and processor.

In order to "read" the card, a user holds it up to the eye and looks through the viewing patch. The user sees what appears to be a large (apparent size can be controlled by the parameters chosen for the lens-sheet/pin-hole light source geometry) display at virtual infinity.

In order to interact with the display, one could use, for example, an input device 706 such as a touch-sensitive surface on one of the card's two faces. Any of the capacitive, or variable resistance, techniques used to support today's touch-screens can be applied here. Recent laptop computers have touch-pads which provide an example of the elegant power of a simple, small, touch-sensitive interface. One such touch pad is Apple Computer's "Track Pad", which may be found on the Apple Powerbook Model 190 CS.

The card's surface preferably allows the user to point to items on the virtual screen by using the tip of the thumb or index finger while looking through the card's viewing patch. The user could page through the contents of the card, open and close files, drag items around on a virtual desktop through the combination of viewing and finger manipulation techniques. Similar to today's point and click interfaces, a finger could drag a cursor until it overlapped an item to be modified, and then increased pressure could cause a selected action such as a "drag" or "open".

Figure 8:
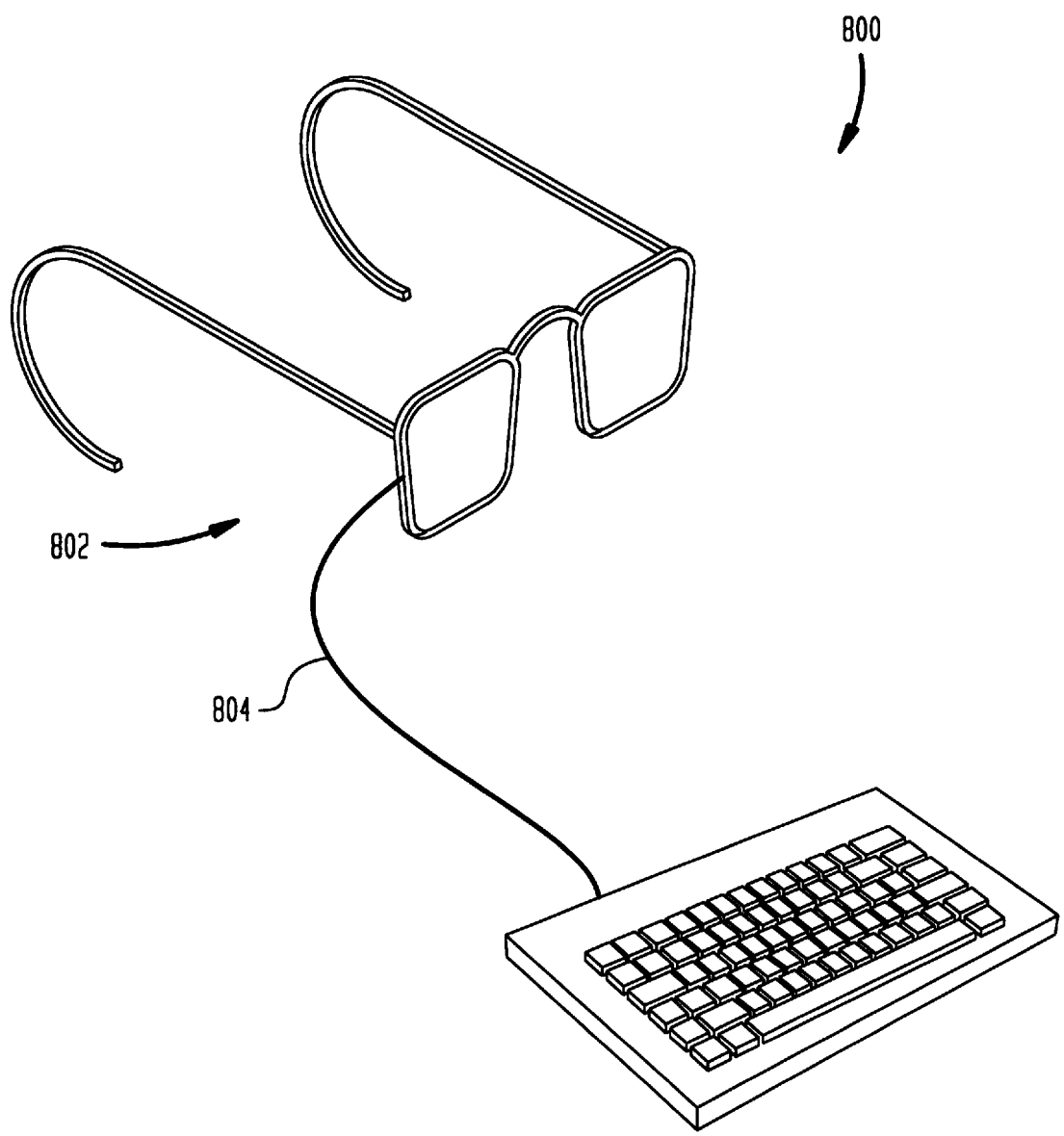
FIG. 8 illustrates a laptop computer having a head mounted virtual display according to the present invention.

Another use for a thin virtual display according to the present invention is a replacement for a laptop computer screen. This need is apparent when the computer is used in areas where it is difficult to put up with the volume and bulk of the fold-open display (e.g., during airline travel). As seen in FIG. 8, a laptop or palmtop computer 800 may be provided without a conventional display and a virtual display 802 according to the present invention the display can be worn as a head-mounted display. The head-mounted display 802 may be connected to the computer using either a wire 804 or using a wireless connection, such as may be used, for example, in a wireless local area network. The bulk and awkward appearance of previously known head mounted displays precludes practical use of the prior art head-mounted displays.

Conclusion

Disclosed and described is a new type of a thin, lightweight virtual display. Although the inventive display is quite small, it provides subjectively large and virtually-placed images. The invention is a thin and light-weight display which can be used for virtual reality. Other applications for the invention may be used wherever a small, planar, display can be accommodated. For example, application to a next generation smart card and to laptop computers to replace the fold-open screens are described.

The above described embodiments of the invention are intended to be illustrative only. Numerous alternative embodiments may be devised by those skilled in the art without departing from the spirit and scope of the following claims.

I claim:

1. A virtual display for a viewer comprising:

a microlens array having a number of microlenses; a display having a plurality of pixels; and an aperture array configured to generate a pin-point of light for each pixel and to direct each pin-point of light to a microlens in said microlens array;

wherein each microlens is configured to receive a pin-point of light and to direct a ray of light so that the rays of light from each microlens are directed to substantially the same focal point to generate a coherent image on the viewer's retina and wherein said microlenses have an f value no greater than 1.

2. The virtual display of claim 1 wherein said microlens array comprises a number of spherical microlenses.

3. The virtual display of claim 1 wherein said display is a liquid crystal display.

4. The virtual display of claim 3, wherein said aperture array comprises an aperture plate positioned between said liquid crystal display and said microlens array.

5. The virtual display of claim 3 wherein said microlenses of said microlens array each have a common focal length and said microlens array is mounted at said common focal length away from said liquid crystal display.

6. The virtual display of claim 3 wherein said aperture array is disposed on a back side of said microlens array.

7. The virtual display of claim 3 wherein said aperture array is disposed on a front surface of said liquid crystal display.

* * * * *